(12) United States Patent
Hong et al.

(10) Patent No.: US 11,993,492 B2
(45) Date of Patent: May 28, 2024

(54) WHEEL SYSTEM, IN PARTICULAR FOR A CRANE

(71) Applicant: Konecranes Global Corporation, Hyvinkää (FI)

(72) Inventors: Tony Hong, Shanghai (CN); Henry Chen, Shanghai (CN); Thomas Düllmann, Hagen (DE); Gregor Jansen, Bottrop (DE); Lukas Pieper, Bochum (DE); Ralph Eising, Bochum (DE); Christoph Greger, Dortmund (DE)

(73) Assignee: Konecranes Global Corporation, Hyvinkää (FI)

( * ) Notice: Subject to any disclaimer, the term of this patent is extended or adjusted under 35 U.S.C. 154(b) by 0 days.

(21) Appl. No.: 18/245,190

(22) PCT Filed: Mar. 3, 2022

(86) PCT No.: PCT/EP2022/055375
§ 371 (c)(1),
(2) Date: Mar. 14, 2023

(87) PCT Pub. No.: WO2022/189245
PCT Pub. Date: Sep. 15, 2022

(65) Prior Publication Data
US 2023/0257240 A1   Aug. 17, 2023

(30) Foreign Application Priority Data
Mar. 8, 2021 (DE) .................. 10 2021 105 522.9

(51) Int. Cl.
*B66C 13/16* (2006.01)
*B60B 17/00* (2006.01)
*B66C 9/08* (2006.01)

(52) U.S. Cl.
CPC .............. *B66C 13/16* (2013.01); *B60B 17/00* (2013.01); *B66C 9/08* (2013.01)

(58) Field of Classification Search
CPC ........... B66C 13/16; B66C 9/08; B60B 17/00; G01B 5/08
See application file for complete search history.

(56) References Cited

U.S. PATENT DOCUMENTS

| | | | |
|---|---|---|---|
| 7,051,584 B2 * | 5/2006 | Robert | B60C 11/24 73/146 |
| 2004/0035164 A1 * | 2/2004 | Blaser | B21D 1/12 72/31.02 |
| 2004/0250613 A1 | 12/2004 | Robert et al. | |

FOREIGN PATENT DOCUMENTS

| | | |
|---|---|---|
| CN | 103681091 A | 3/2014 |
| CN | 107720543 B | 4/2019 |
| CN | 210084752 U | 2/2020 |

(Continued)

*Primary Examiner* — Scott A Browne
(74) *Attorney, Agent, or Firm* — Gardner, Linn, Burkhart & Ondersma LLP

(57) ABSTRACT

The invention relates to a wheel system having a running wheel and a support body which at least partially surrounds the running wheel and in which the running wheel is mounted and from which the running wheel projects in order to come into contact with a rail. In order to allow predictive maintenance of the wheel system with a low inspection effort, it is proposed that a mechanical device for detecting and/or determining wear on the running wheel is mounted on the support body.

15 Claims, 10 Drawing Sheets

(56) References Cited

FOREIGN PATENT DOCUMENTS

Figure 1:
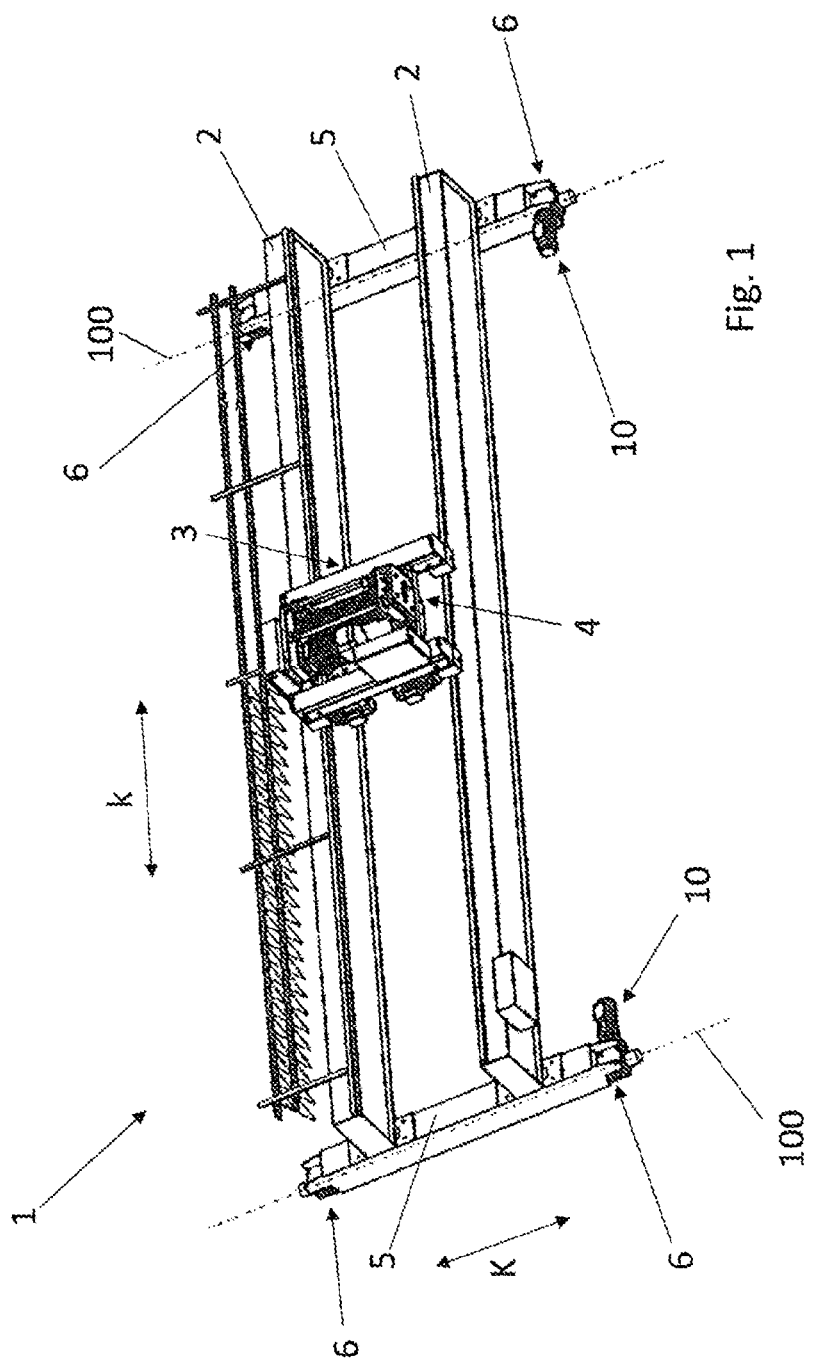

| | | |
|---|---:|---:|
| DE | 31 34 750 C2 | 11/1983 |
| DE | 19 540 217 C1 | 1/1997 |
| DE | 10 2004 008 552 B3 | 7/2005 |
| DE | 10 2010 008 232 B4 | 11/2011 |
| DE | 10 2017 115 222 A1 | 1/2019 |
| DE | 10 2019 210884 A1 | 1/2021 |
| JP | S5228865 U | 2/1977 |
| JP | 2000-177981 A | 6/2000 |
| JP | 2017 146227 A | 8/2017 |
| WO | 2009/028776 A1 | 3/2009 |

* cited by examiner

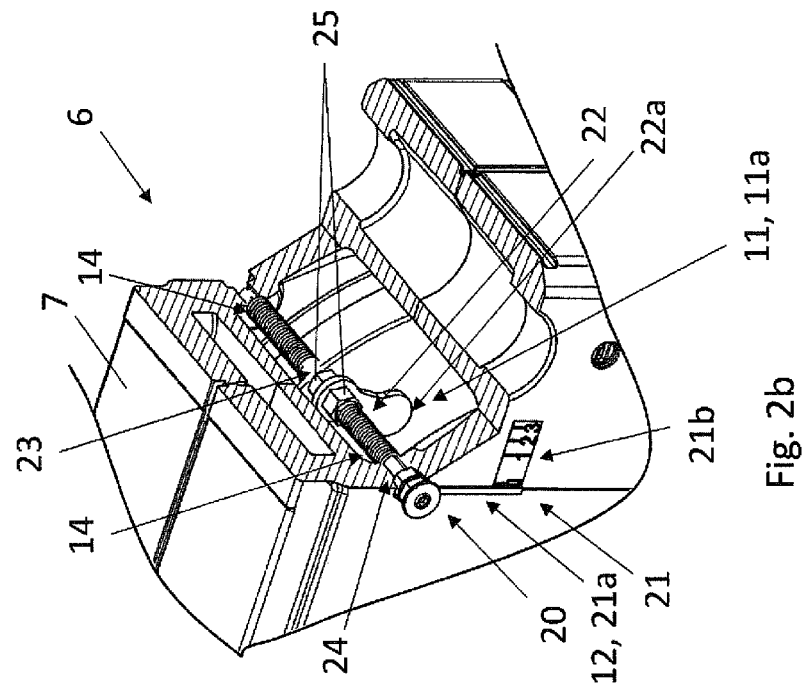
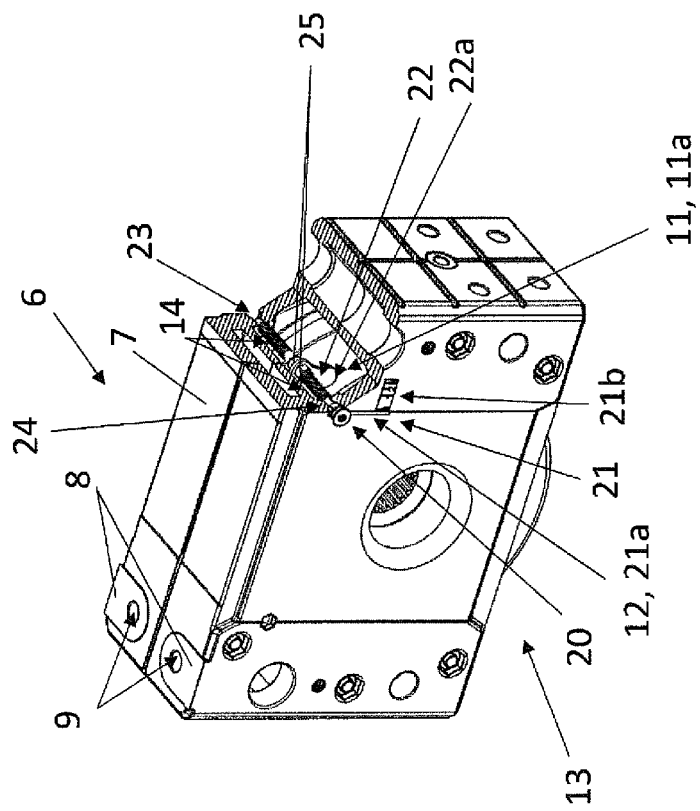

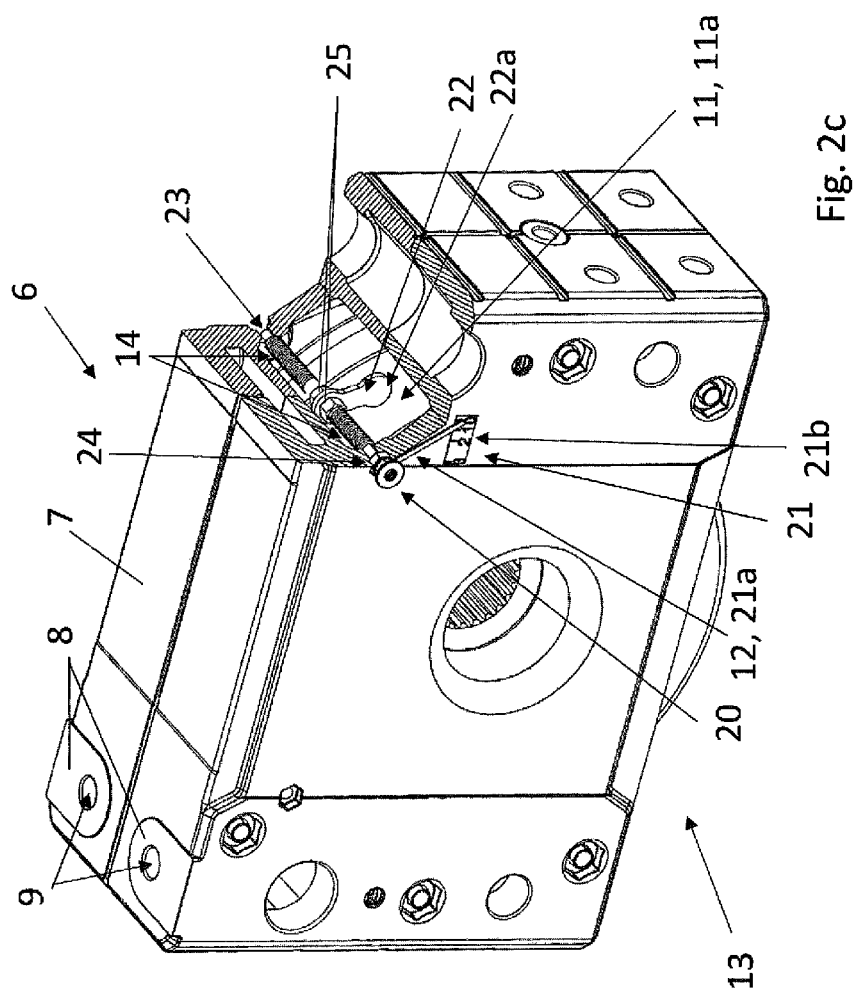

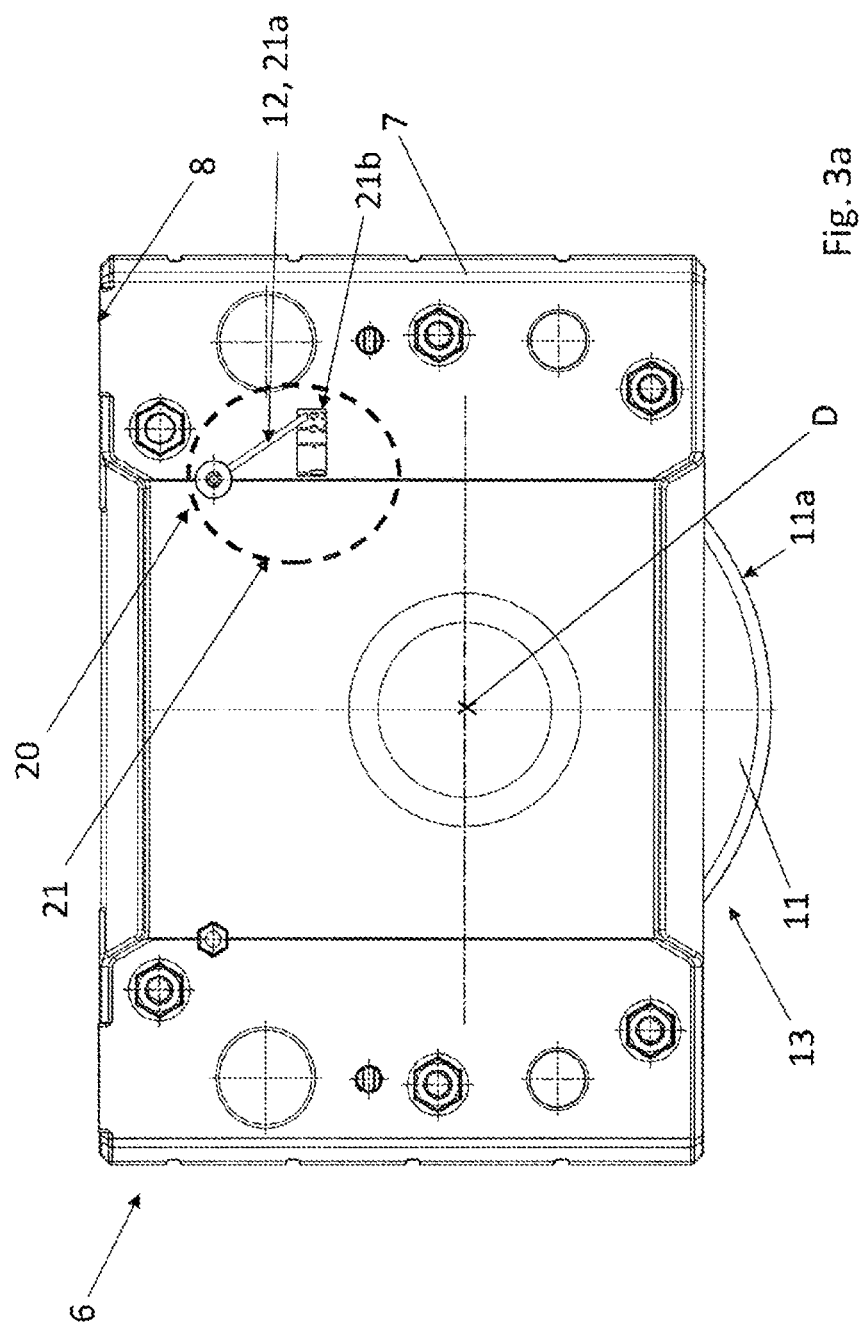

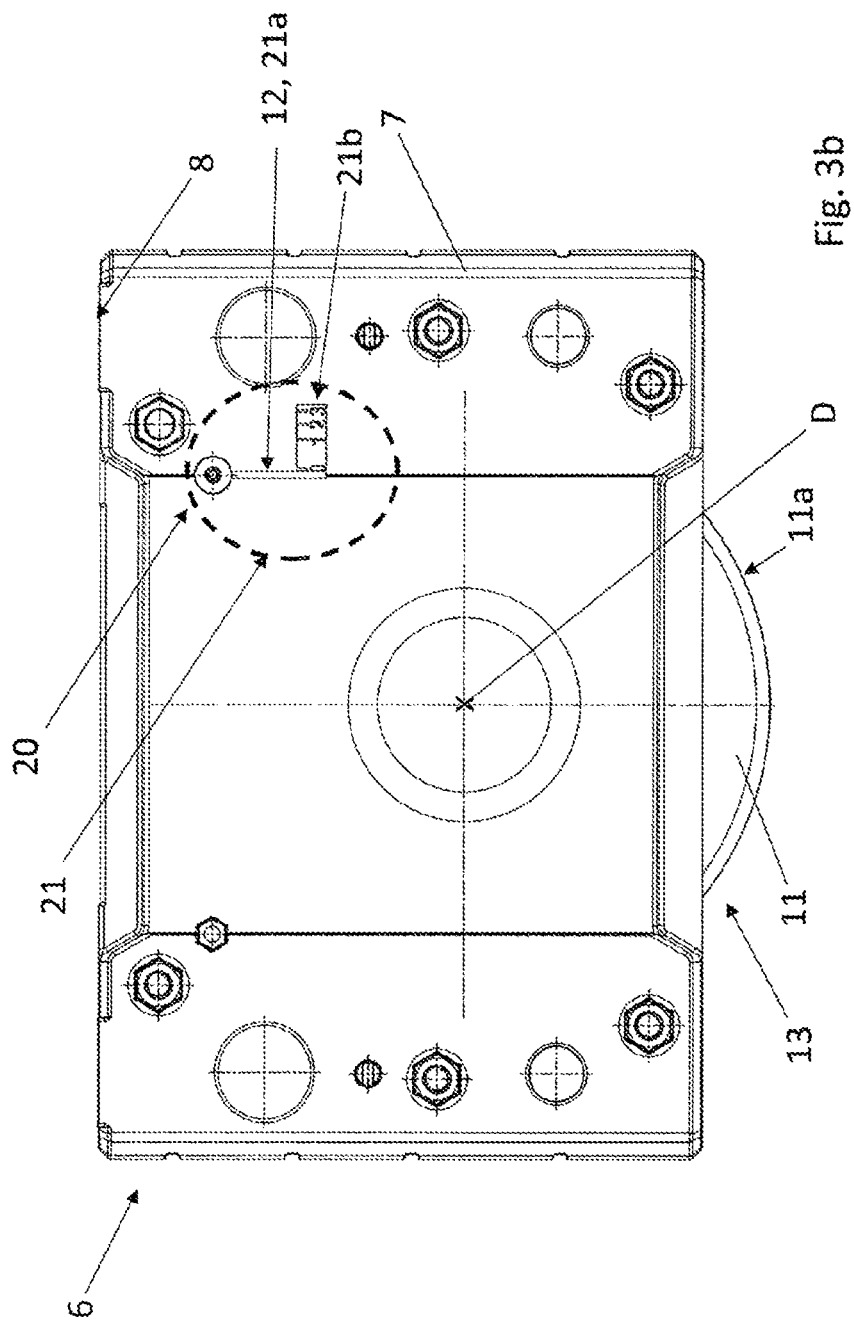

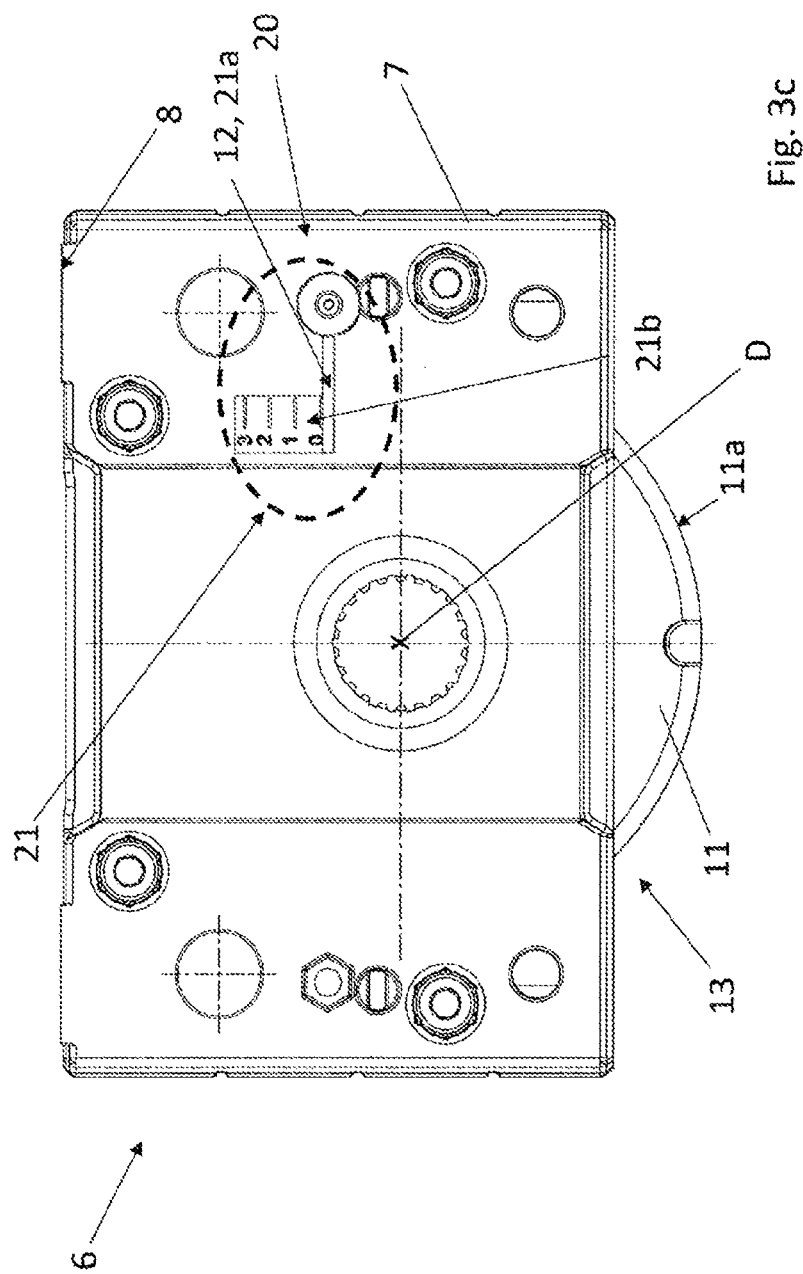

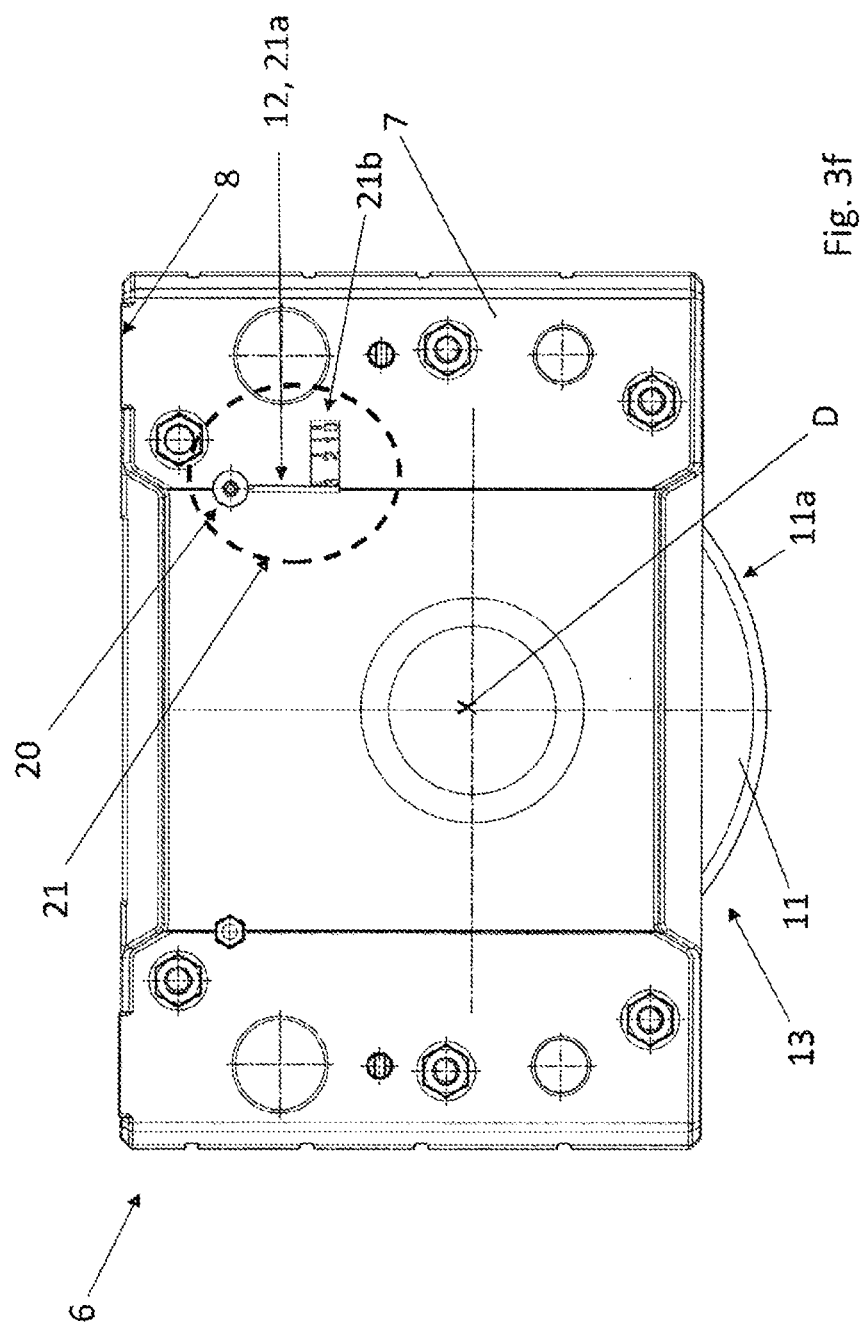

WHEEL SYSTEM, IN PARTICULAR FOR A CRANE

The invention relates to a wheel system according to the preamble of claim 1.

Such a wheel system, designed as a so-called wheel block is known, for example, from DE 10 2004 008 552 B3, DE 19 540 217 C1, or DE 31 34 750 C2. As a result of wear on the running wheel of such a wheel system, which is installed, for example, on a crane carriage support, defects and possibly a resulting accident can arise. In order to avoid this, a timely replacement of the worn running wheel is required. One possibility for inspecting the wear is for the wheel system to be dismantled and disassembled into its components. The running wheel can subsequently be examined for wear. Alternatively, the wear can be examined by means of markings by initially marking the contact point of the wheel on the rail on both parts. Subsequently, one revolution of the wheel is used to apply a further marking on the rail and to measure the distance between the markings. This then allows deriving the wheel circumference and diameter and thus the potential wear.

An overhead traveling crane having a system for detecting wear on the running wheels thereof is known from JP 2017 146 227 A. The system comprises two laser distance meters, reflectors, and a controller. A disadvantage of such a solution is a comparatively high cost and operating effort and a comparatively low robustness of the system against mechanical influences, such as vibrations.

A mechanical device for detecting wear on crane wheels is known from JP 2000-177 981 A. DE 10 2010 008 232 B4 relates to tool trolleys for a plate processing system and describes the detection and compensation of wear with respect to the wheels thereof.

The detection of wear on wheels is also described in DE 10 2019 210 884 A1, DE 10 2017 115 222 A1 and WO 2009/028776 A1.

Proceeding from this prior art, the object of the present invention is to enable a predictive maintenance of a wheel system of the generic type with a low inspection effort.

This object is achieved by a wheel system having the features of claim 1. Advantageous embodiments of the invention are specified in the dependent claims and the following description.

According to the invention, in the case of a wheel system having a running wheel and a support body which at least partially surrounds the running wheel and in which the running wheel is mounted and from which the running wheel projects in order to come into contact with a rail, predictive maintenance with a low inspection effort is enabled in that a mechanical device for detecting and/or determining wear on the running wheel is mounted on the support body. Preferably, the mechanical device is mounted movably on the support body in such a way that it can be brought into contact with the running wheel in order to detect and/or determine wear on the running wheel, and for this purpose can be brought into abutment in particular on a running surface of the running wheel. For this purpose, a movable part of the mechanical device is preferably brought into contact with the running wheel from a standby position remote from the running wheel.

The mechanical device is thus integrated into the support body. The wheel system and in particular its running wheel can be driven by a drive unit, in particular with an electric motor. The wheel system according to the invention can optionally be used for a crane, in particular an overhead traveling crane, which is typically displaceable bound to a rail, wherein the running wheel of the wheel system, as one of a plurality of running wheels of the crane, is in contact with the given rail and rolls along it.

The running wheel mounted in the support body is rotatable about an axis of rotation oriented horizontally in the usual installation position of the running wheel. The running wheel is preferably mounted by means of a hub which is held laterally in each case in a sliding bearing and/or roller bearing which is inserted into the support body.

By means of the mechanical device which is mounted on the support body and is thus integrated into the wheel system and permanently present, the wear of the running wheel is detectable and/or determinable in an installed state of the running wheel. Neither dismantling of the wheel system, in particular removal of the running wheel, nor a separate measuring instrument separate from the wheel system are necessary for this purpose. The mechanical device is preferably configured such that it works discontinuously and has to be actuated manually to detect and/or determine wear on the running wheel. Accordingly, without manual actuation, there is no detection and/or determination of wear on the running wheel.

In the context of the invention, "detection" or "detectable" means that it is possible to identify that wear of the running wheel is present. In the context of the invention, "determination" or "determinable" means that the wear of the running wheel is quantifiable and thus can be numbered.

The mechanical device allows a robust and cost-effective solution for early detection of wear during operation compared to a sensor-based system solution, as is known, for example, from JP 2017 146 227 A. No effort in terms of control technology is required. Predictive maintenance of the wheel system, in particular of the running wheel, is thus possible in a simple manner.

In a particularly advantageous manner, it is also provided that the mechanical device has a probe which can be brought into contact with the running wheel in order to abut on a running surface of the running wheel in order to detect and/or determine wear. The probe preferably has a free end, which is preferably brought into contact with the running wheel from a standby position remote from the running wheel. In contrast to contactless, for example optical, sensors, the probe thus senses any wear on the running wheel by contact.

Within the scope of the discontinuous mode of operation, there is consequently no permanent contact of the probe with the running wheel. The contact with the running wheel for detecting and/or determining wear on the running wheel must be triggered by manual actuation of the mechanical device. For this purpose, an actuating element which is coupled to the probe and can be reached from the outside of the support body by an operator can be provided. As long as no actuation occurs, the probe can be located in the standby position remote from the running wheel. This discontinuous mode of operation of the mechanical device prevents a further wear point on the probe and/or on the running wheel.

The running surface is arranged on the circumference of the running wheel and is in particular used for contact between the running wheel and a rail. When the running wheel moves, wear occurs on the running surface.

The probe is rigid and dimensionally stable and has a shape, e.g., an elongate shape, suitable for the repeatably precise abutment on the running wheel. For this purpose, the probe can be produced, for example, from a metal sheet, in particular aluminum sheet, or a plastic.

In a structurally simple manner, the mechanical device comprises a visual indicator which is arranged outside the support body. The indicator is designed and connected to the probe in such a way that it can visualize the result of the detection and/or determination of the wear.

As a result, an indication of the wear state is provided which is visible outside the wheel system. As a result, an operator can perceive the result of the detection and/or determination of the wear without needing to open or disassemble the wheel system into its components.

It is particularly advantageously provided that the visual indicator comprises a pointer which is rigidly connected to the probe, in particular by means of a rod or pin, and forms a movable part of the mechanical device. The pointer can simultaneously serve as an actuating element in order to bring the probe into contact with the running wheel by the actuation thereof.

The movable part of the mechanical device thus comprises the probe and the pointer.

For cases in which determination of the wear is intended, the visual indicator comprises a scale which is arranged in particular on an outer surface of the support body. The scale can have two or more reading points which are optionally provided with a predetermined designation for the given degree of wear. The state of the running wheel and its wear are then determinable by reading by means of the scale and the position of the pointer relative thereto when the probe abuts on the running wheel.

For cases in which detection of wear is intended, however, only a single marking on the outer surface of the support body is required. By means of the marking, a position of the pointer representing a certain degree of wear or a change in position of the pointer compared to a known wear-free initial position can, for example, be identified when the probe abuts on the running wheel. In a particularly simple implementation, a single notch on the outside of the housing is thus, for example, sufficient.

A connection between the pointer and the probe is preferably designed to be detachable and positive and/or non-positive. Depending on the geometric design of the probe and of the pointer, the movable part can also comprise a connecting element designed, for example, as a rod or pin, which is arranged between the probe and the pointer and is preferably detachably and rigidly connected.

The connection between the probe and the connecting element is then preferably designed to be detachable and in particular positive and/or non-positive. For this purpose, the connecting element can have a thread on which the probe can be held and fixed in the axial direction, for example by means of two, in particular locked, nuts. The connection between the pointer and the connecting element is then preferably designed to be detachable and in particular positive and/or non-positive.

A change in the position or orientation of the probe abutting on the running wheel, which change is induced, preferably exclusively, by the wear on the running wheel, is transmitted directly to the pointer due to the rigid connection. In other words, the pointer moves to the same extent, in particular by the same rotational angle, as the probe. It is not necessary for the probe and pointer to have the same orientation.

Since the pointer is arranged outside the support body and the probe is arranged inside it, an opening in a side wall of the housing through which the connecting element is guided is required for the movable part of the mechanical device.

The pointer is understood to mean a rigid and dimensionally stable element which is suitable for an indication, and, for this purpose, in particular has a free end designed as a "tip." The shape of the pointer is freely selectable.

Advantageously, the movable part of the mechanical device is rotatably and/or translationally movably mounted on the support body. In particular, the connecting element, i.e., for example, the rod or pin, is rotatably and/or translationally movably mounted on the support body. In the case of a translationally movable mounting, the translational movement preferably takes place parallel to the axis of rotation of the running wheel. As a result of the rotatable mounting, the connecting element forms an axis of rotation of the mechanical device, in particular for the probe and the pointer, and thus for the movable part of the mechanical device. Accordingly, rotations take place about a longitudinal axis of the connecting element. The probe and the pointer are preferably arranged and oriented in such a way that they extend away from the axis of rotation transversely, in particular at right angles, in the manner of a clock. It is possible for the probe and the pointer to extend in different directions.

According to a particularly simple embodiment, it can be provided that, without manual actuation of the mechanical device, the contact between the probe and the running wheel is released solely via gravity and the probe is moved by gravity into the standby position. For this purpose, the connecting element and the probe must be designed accordingly and arranged on the support body in relation to the running wheel.

Alternatively or additionally, it can advantageously be provided that the movable part of the mechanical device can be locked in relation to the support body in order to hold the probe in the standby position remote from the running wheel, in particular as soon as the manual actuation ends.

The locking can take place, for example, with a positive connection, wherein a positive connection between the movable part and a receptacle preferably arranged on the support body is produced by manual actuation and by a movement of the movable part caused thereby. The receptacle corresponds with regard to its shape to a corresponding contour of the movable part, for example the connecting element.

Alternatively or additionally, the locking can take place with a non-positive connection, in particular by means of at least one spring element of the mechanical device, wherein, without manual actuation, i.e., in particular when the previously performed manual actuation has ended, a non-positive connection between the movable part and the support body is produced. For this purpose, the movable part, in particular its connecting element, can, for example, be tensioned in the axial direction in relation to the support body by means of the spring element.

The locked state, in particular the positive and/or non-positive connection, of the movable part can be released by an actuation of the mechanical device, in particular of the actuating element, in order for it to leave the standby position and subsequently be able to produce the contact between the probe and the running wheel. In the case of a positive locking, an opposite movement of the movable part out of the receptacle by manual actuation is required for this purpose. In the case of a non-positive locking, a movement against the holding force of the non-positive connection, in particular the corresponding spring force, by manual actuation is required for this purpose.

A combination of a positive and non-positive locking is particularly advantageous. In this case, the non-positive connection thus ensures, for example, by means of the at least one spring element, that the positive connection produced is maintained as soon as the actuation by the operator ends. Accordingly, by means of a manual actuation, the non-positive connection must first be released in order to subsequently also completely release the positive connection, and thus the locking, and be able to leave the standby position.

In an optional embodiment, it can be provided that the support body is designed as a housing which has a plurality of, preferably five, side walls surrounding the running wheel.

According to a further embodiment of the wheel system, the support body can be part, in particular a supporting structural part, of a carriage support. As a result, the carriage support itself has a housing function for the running wheel and for the components of the mechanical device arranged in the support body for detecting and/or determining wear on the running wheel, in particular the probe and the connecting element, as well as the optional spring element(s).

According to a further embodiment, the support body can have a connecting surface in order to be connected thereby, i.e., mounted, to a carriage support. The support body can thus also be designed as a housing which is separate from the carriage support and can be detachably fastened thereto. Of course, further connecting surfaces may be provided, for example for connecting a drive unit for the running wheel. In this case, the connecting surface can be brought into abutment on a counter surface by means of a screw or bolt connection in order to produce the corresponding connection, for example on the carriage support or the drive unit. For the screw or bolt connection, corresponding connection bores are provided, into which corresponding screws or bolts engage.

In particular, the support body can be designed as a box-shaped housing which is open on its underside, wherein the running wheel then projects through an opening there. In this case, the wheel system is also referred to as a wheel block. The housing can be composed of a plurality of parts in this case, preferably of two identical housing halves, which results in a correspondingly symmetrical structure of the housing.

The housing can then have a connecting surface, also referred to as a head connecting surface, on a side opposite the underside, which connecting surface is used to connect the wheel system or the wheel block to a carriage support of a crane, for example.

According to the invention, a crane, in particular an overhead traveling crane, in particular a bridge crane or gantry crane, is also improved in that it comprises a wheel system according to the invention. The advantages described for the wheel system apply accordingly to the crane.

Both in a crane and in other applications, the carriage support can be designed, for example, as a T beam, double-T beam, box beam, L-profile beam, or C-profile beam. A plurality of wheel systems can be arranged on a single carriage support. In the case of two wheel systems, the wheel systems are arranged one behind the other in particular in a running direction of the running wheels. Of course, it is conceivable that the wheel systems are also arranged next to one another with respect to the running direction of the running wheels. A combination of both is also possible.

In the case of a crane application, the carriage support can be arranged on a bridge of an overhead traveling crane or on a support of a gantry crane and/or on a crane trolley of the overhead traveling crane or gantry crane. Of course, the wheel system according to the invention can also be used on other crane types.

Figure 2D:
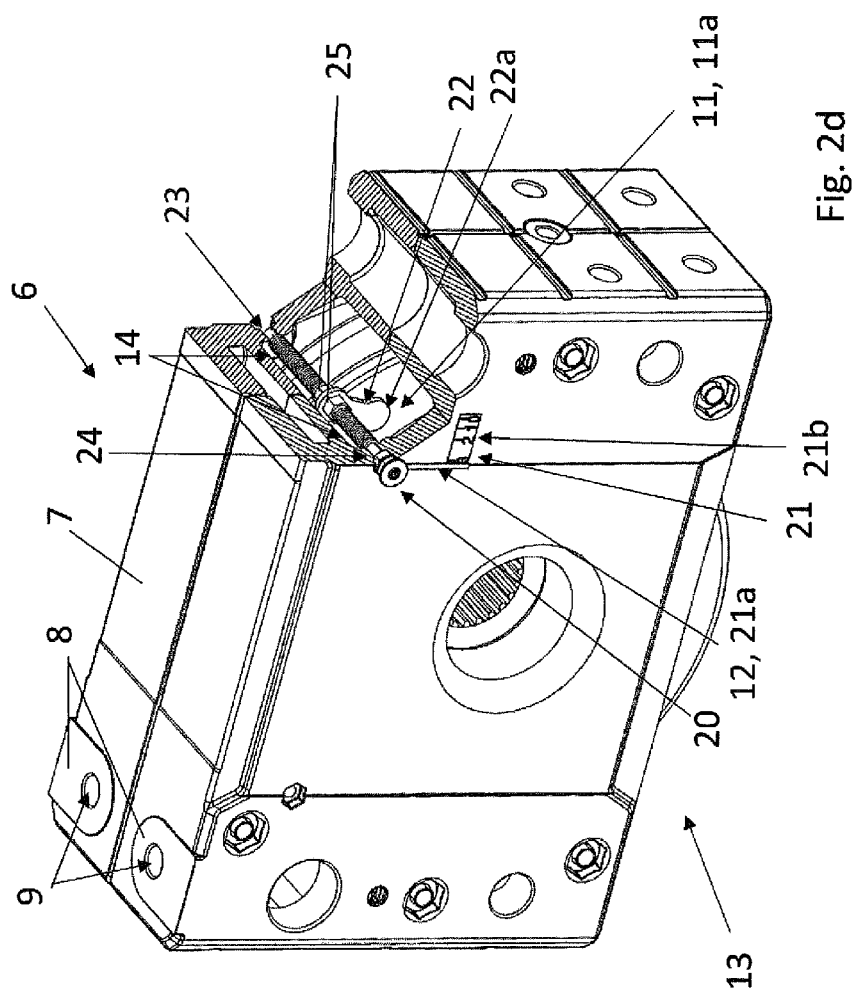

Further details of the invention emerge from the following description of exemplary embodiments with reference to the drawing, in which:

FIG. 1 shows a schematic, perspective view of an overhead traveling crane,

FIG. 2a shows a schematic, perspective and partial sectional view of a wheel system designed as a wheel block, having a mechanical device for detecting and/or determining wear on a running wheel of the wheel block, FIG. 2b shows an enlarged detail of FIG. 2a, FIGS. 2c and 2d show schematic, perspective and partial sectional views of a wheel system designed as a wheel block, having a mechanical device for detecting and/or determining wear on a running wheel of the wheel block with different degrees of wear, and FIGS. 3a to 3f each show a side view of a wheel system designed as a wheel block, having a visual indicator for detecting and/or determining wear on the running wheel of the wheel block.

FIG. 1 shows a schematic, perspective view of an overhead traveling crane 1, which is designed here, by way of example, as a so-called double-girder bridge crane. The overhead traveling crane 1 can be moved substantially horizontally in a crane travel direction K on a rail path with two rails 100 (indicated schematically by dotdashed lines) that are parallel to one another and spaced apart from one another (also termed wheel tracks).

The overhead traveling crane 1 comprises two box girders 2 which extend parallel to and at a distance from one another and which, by way of example, form a horizontal crane girder and serve as a travel path for a trolley 3 with a hoist 4. In this context, the trolley 3 moves on the box girders 2 in a horizontal trolley travel direction k which is oriented at right angles to the crane travel direction K. Accordingly, the box girders 2 also extend in the trolley travel direction k. Alternatively, only a single box girder or double-T profile may also be provided in the manner of a single-girder bridge crane. The trolley 3 then moves, for example, on a lower flange of the box girder. In order to form the respective crane girder, truss girders can be used instead of box girders.

The box girders 2 lie on their respective opposite ends on carriage supports 5 extending transversely thereto, and thus in the crane travel direction K. One wheel system designed as a wheel block 6 is arranged at each of the opposite ends of the carriage supports 5, with at least one of the two wheel blocks 6 per carriage support 5 being driven by an electric motor 10. The wheel blocks 6 are each movable with their running wheel 11 (see FIGS. 2a and 2b as well as 3a to 3f) on the rails 100 in the crane travel direction K. Of course, the wheel blocks 6 can also be used on other crane types.

FIG. 2a shows a schematic, perspective and partial sectional view of a wheel system designed, by way of example, as a wheel block 6, having a mechanical device 20 for detecting and/or determining wear on the running wheel 11 of the wheel block 6. FIG. 2b shows an enlarged detail of FIG. 2a.

The wheel system designed as a wheel block 6 has a support body in the form of an exemplary box-shaped housing 7 (see also FIGS. 3a to 3f), which is composed of two identical housing halves. On the upper side of the housing 7, a connecting surface 8 is provided; of the total of four connection bores 9 therein, only two are shown due to the partial view. When the wheel block 6 is installed on the carriage support 5, the connecting surface 8 comes to abut on a counter surface on the carriage support 5 in order to be fastened thereto by screws or bolts engaging in the connection bores 9.

The running wheel 11 is arranged in the housing 7 and is rotatably mounted in the housing 7 about an axis of rotation D (see FIGS. 3a to 3f), and in this case is partially surrounded by the support body, in particular housing 7. On its circumference, the running wheel 11 has a running surface 11*a* which is in contact with the rails 100 (see FIG. 1) during operation.

The mechanical device 20 is arranged in the upper region of the housing 7, and is arranged at a distance from the running wheel 11 and mounted in the housing 7 in such a way that a probe 22 of the mechanical device, and in particular its free end 22*a*, can be brought into contact with the running surface 11*a* from a standby position remote from the running wheel 11, so that it abuts thereon as shown in FIGS. 2*a* and 2*b*.

The probe 22 is detachably fastened by means of two nuts 25 to a connecting element, which is designed as a pin 23, by way of example, and has a thread for this purpose. For this purpose, the two nuts 25 are arranged on opposite sides of the probe 22 and locked in relation to one another.

In order to be able to produce the contact of the probe 22 with the running wheel 11 for detecting and/or determining wear on the running wheel 11 by manual actuation of the mechanical device, an actuating element 12 is provided which is coupled to the probe 22 via the pin 23 and can be reached on the outside of the housing 7 by an operator.

The pin 23 is rotatably and translationally movably mounted on the housing 7. In addition, the pin 23 is tensioned in relation to the housing 7 in the axial direction by means of at least one spring element 14, in the present case, by way of example, by means of two spring elements 14, and can at the same time be locked with a positive connection in a receptacle on the housing 7 in such a way that the probe 22 is thereby held in the standby position. By manual actuation of the mechanical device 20, which causes a movement of the pin 23 in the axial direction against the spring force, the positive connection with the receptacle can be released so that the pin 23 can subsequently be rotated in order to produce the contact between the probe 22 and the running surface 11*a*.

In addition to the probe 22, a pointer 21*a* of a visual indicator 21 for detecting and/or determining wear on the running wheel 11 of the wheel block 6 (see also FIGS. 3*a* to 3*f*) is fastened to the pin 23 serving as a connecting element, and simultaneously serves as the actuating element 12. Together with the probe 22 and the pin 23, the pointer 21*a* forms a movable part of the mechanical device 20, which is rotatably and translationally movably mounted on the housing 7, in particular due to the described mounting of the pin 23, and can be locked in relation to the housing 7 by means of the receptacle.

The pointer 21*a* is arranged outside the housing 7. For this purpose, the pin 23 is guided through an opening 24 in a side wall of the housing 7. The pointer 21*a* serves to detect and/or determine wear on the running wheel 11 even if the latter is installed in the wheel block 6.

FIGS. 2*c* and 2*d* show schematic, perspective and partial sectional views of a wheel system designed as a wheel block 6, having a mechanical device 20 for detecting and/or determining wear on a running wheel 11 of the wheel block 6 with different degrees of wear. In this case, the wear of the running wheel 11 in FIG. 2*d* is greater than in FIG. 2*c*; the probe 22 brought into contact with the running wheel 11, in particular the free end 22*a* of said probe, is less far from the axis of rotation of the running wheel 11 at the contact point with the running wheel 11 in FIG. 2*d* than in FIG. 2*c*. This is indicated by the indicator 21 and the pointer 21*a* thereof, as explained in more detail below. Moreover, the statements relating to FIGS. 2*a* and 2*b* also apply to the wheel system of FIGS. 2*c* and 2*d*.

FIGS. 3*a* to 3*f* each show a side view of a wheel system designed as a wheel block 6, with a visual indicator 21 for detecting and/or determining wear on the running wheel 11 of the wheel block 6, as can also be present in the examples of FIGS. 2*a* to 2*d* and are shown there by way of example.

The housing 7 is open on its underside 13, wherein the running wheel 11 projects partially through an opening. The running wheel 11 is mounted by means of a hub (not visible). The hub is held laterally in each case in a sliding bearing and/or roller bearing (not visible), which are inserted into the housing 7. The running wheel 11 is rotatable about an axis of rotation D extending transversely to the crane travel direction K. In the usual installation position, the axis of rotation D is oriented horizontally.

The visual indicator 21 belongs to the mechanical device 20 as described in connection with FIGS. 2*a* and 2*b* in an exemplary embodiment. The visual indicator 21 comprises the pointer 21*a* and a scale 21*b*, by means of which the wear of the running wheel 11 can be detected and determined. The scale 21*b* respectively has, by way of example, four reading points, which are provided with a predetermined designation for the respective degree of wear (in this case, the numbers "0," "1," "2," "3").

In the present examples, the indicator 21, and in particular the pointer 21*a* and the reading points, can be configured in such a way that, with increasing wear, the number indicated by the pointer 21*a* becomes greater and thus represents an increasing wear (FIGS. 2*c* and 2*d* as well as 3*e* and 3*f*) or becomes smaller and thus represents a decreasing circumference of the running wheel 11 (FIGS. 2*a* and 2*b* as well as 3*a* to 3*d*). Of course, the scale 21*b* can also have a different number of reading points and/or other designations for the at least one reading point.

Figure 3D:
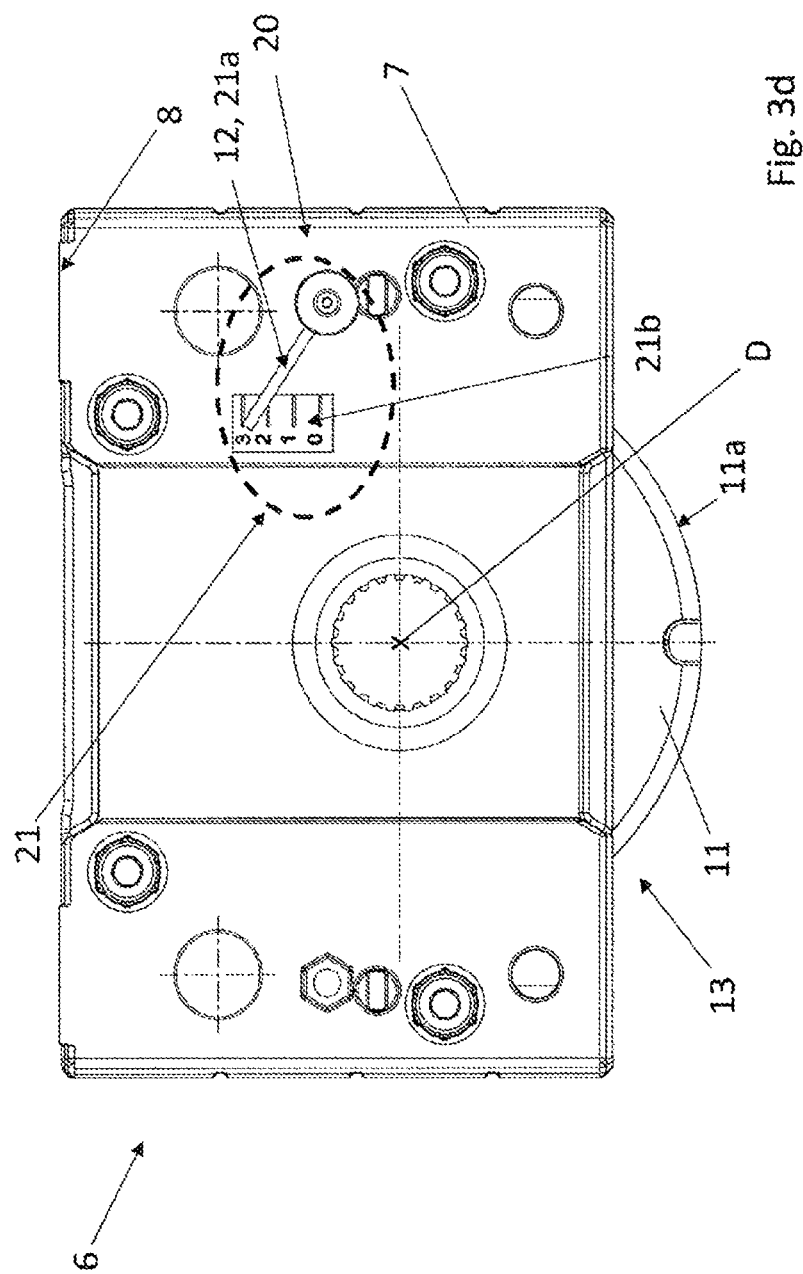
Figure 3E:
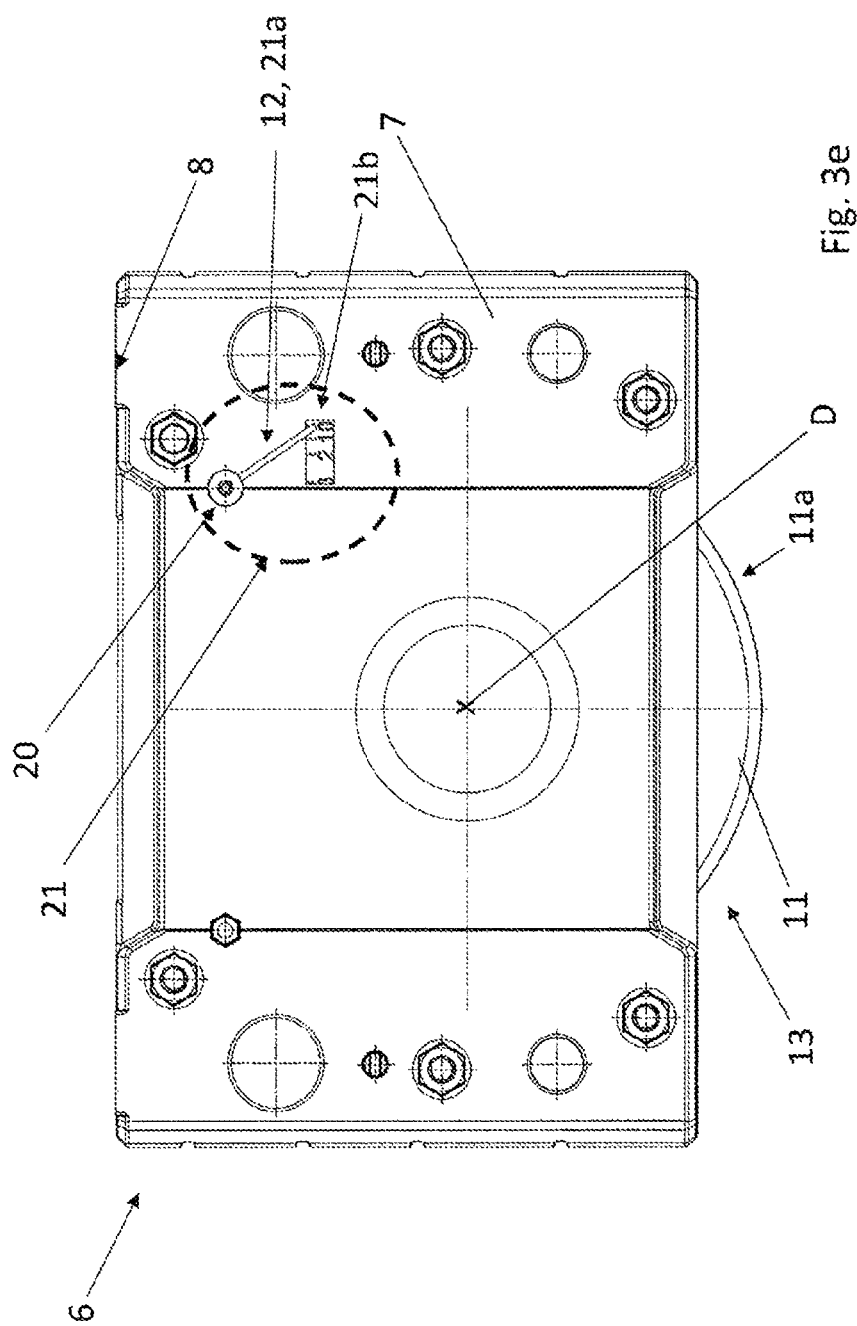

FIGS. 3*a* and 3*b* as well as 3*e* and 3*f* differ from FIGS. 3*c* and 3*d* only in that the visual indicator 21 is arranged on different sides of the housing 7, and by a different arrangement of the scale 21*b*, the reading points, and the pointer 21*a* relative to one another. FIGS. 3*a* and 3*b* correspond to FIGS. 3*e* and 3*f* with the exception of the reverse arrangement of the reading points. FIGS. 3*b* and 3*c* as well as 3*e* each show a position of the pointer 21*a* directed toward the reading point "0," whereas the pointer 21*a* in FIGS. 3*a* and 3*d* as well as 3*f* points at the reading point "3." Depending on the previously determined definition, the number "0" can thus indicate a minimum (FIG. 3*e*) or maximum (FIG. 3*b*) wear, wherein the same applies conversely when the number "3" is indicated. It is possible for the probe 22 and the pointer 21*a* to extend in different directions.

LIST OF REFERENCE SIGNS

1 Overhead traveling crane
2 Box girder
3 Trolley
4 Hoist
5 Carriage support
6 Wheel block
7 Housing
8 Connecting surface
9 Connection bore
10 Electric motor
11 Running wheel
11*a* Running surface
12 Actuating element
13 Underside
14 Spring element
20 Device 21 Visual indicator
21a Pointer
21b Scale
22 Probe
22a Free end
23 Pin
24 Opening
25 Nut
100 Rail
D Axis of rotation
k Trolley travel direction
K Crane travel direction

The invention claimed is:

1. A wheel system having a running wheel and a support body which at least partially surrounds the running wheel and in which the running wheel is mounted and from which the running wheel projects in order to come into contact with a rail, wherein a mechanical device for detecting and/or determining wear on the running wheel is mounted on the support body, wherein the mechanical device comprises a probe which can be brought into contact with the running wheel in order to abut on a running surface of the running wheel in order to detect and/or determine wear, wherein the mechanical device comprises a visual indicator that is arranged outside the support body, and wherein the probe has a free end that from a standby position remote from the running wheel can be brought into contact with the running wheel in order to abut on the running surface of the running wheel in order to detect and/or determine wear, and wherein the visual indicator comprises a pointer that is rigidly connected to the probe via a connector and forms a movable part of the mechanical device.

2. The wheel system according to claim 1, wherein the movable part of the mechanical device is rotatably and/or translationally movably mounted on the support body.

3. The wheel system according to claim 1, wherein the movable part of the mechanical device can be locked in relation to the support body with a non-positive and/or positive connection in order to hold the probe in the standby position remote from the running wheel.

4. The wheel system according to claim 1, wherein the support body is designed as a housing having a plurality of side walls surrounding the running wheel.

5. The wheel system according to claim 1, wherein the support body comprises a supporting structural part of a carriage support.

6. The wheel system according to claim 1, wherein the support body comprises a connecting surface in order to thereby be connected to a carriage support.

7. A crane having a wheel system according to claim 1.

8. The crane of claim 7, wherein the crane comprises an overhead traveling crane configured as a bridge crane or a gantry crane.

9. The wheel system according to claim 3, wherein the movable part of the mechanical device is rotatably and/or translationally movably mounted on the support body.

10. The wheel system according to claim 5, wherein the movable part of the mechanical device can be locked in relation to the support body in order to hold the probe in the standby position remote from the running wheel.

11. The wheel system according to claim 4, wherein the movable part of the mechanical device can be locked in relation to the support body in order to hold the probe in the standby position remote from the running wheel.

12. The wheel system according to claim 1, wherein the support body is designed as a housing having five side walls surrounding the running wheel.

13. The wheel system according to claim 1, wherein the support body comprises part of a carriage support.

14. A wheel system having a running wheel and a support body which at least partially surrounds the running wheel and in which the running wheel is mounted and from which the running wheel projects in order to come into contact with a rail, wherein a mechanical device for detecting and/or determining wear on the running wheel is mounted on the support body, wherein the mechanical device comprises a probe which can be brought into contact with the running wheel in order to abut on a running surface of the running wheel in order to detect and/or determine wear, wherein the mechanical device comprises a visual indicator that is arranged outside the support body, wherein the visual indicator comprises a pointer that is connected to the probe and forms a moveable part of the mechanical device, and wherein the movable part of the mechanical device is rotatably and/or translationally movably mounted on the support body.

15. A wheel system having a running wheel and a support body which at least partially surrounds the running wheel and in which the running wheel is mounted and from which the running wheel projects in order to come into contact with a rail, wherein a mechanical device for detecting and/or determining wear on the running wheel is mounted on the support body, wherein the mechanical device comprises a probe which can be brought into contact with the running wheel in order to abut on a running surface of the running wheel in order to detect and/or determine wear, wherein the probe from a standby position remote from the running wheel can be brought into contact with the running wheel in order to abut on the running surface of the running wheel in order to detect and/or determine wear, and wherein the mechanical device comprises a visual indicator that is arranged outside the support body, and wherein the visual indicator comprises a pointer that is connected to the probe and forms a movable part of the mechanical device, and wherein the movable part of the mechanical device is rotatably and/or translationally movably mounted on the support body.

\* \* \* \* \*